(12) United States Patent
Kim

(10) Patent No.: US 11,402,055 B2
(45) Date of Patent: Aug. 2, 2022

(54) ROBOT

(71) Applicant: LG ELECTRONICS INC., Seoul (KR)

(72) Inventor: Moonchan Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 299 days.

(21) Appl. No.: 16/606,573

(22) PCT Filed: Mar. 13, 2019

(86) PCT No.: PCT/KR2019/002910
§ 371 (c)(1),
(2) Date: Oct. 18, 2019

(87) PCT Pub. No.: WO2020/184759
PCT Pub. Date: Sep. 17, 2020

(65) Prior Publication Data
US 2021/0332935 A1     Oct. 28, 2021

(51) Int. Cl.
*F16M 11/08*     (2006.01)
*F16M 11/10*     (2006.01)
*F16M 11/22*     (2006.01)

(52) U.S. Cl.
CPC ............ *F16M 11/10* (2013.01); *F16M 11/22* (2013.01); *F16M 11/08* (2013.01)

(58) Field of Classification Search
USPC ............ 361/679.21, 679.55, 679.56, 679.61, 361/679.02, 679.06; 348/787, 789, 794, 348/825, 836; 312/7.2, 223.1, 223.2, 312/223.3; 248/918, 919, 920, 921, 922, 248/923, 133, 135, 139, 143, 144, 145
See application file for complete search history.

(56) References Cited

U.S. PATENT DOCUMENTS

| | | | |
|---|---|---|---|
| 3,735,041 A | * | 5/1973 | Fujita .................. H04N 5/64 348/836 |
| 2014/0220412 A1 | | 8/2014 | Lee et al. |
| 2016/0236353 A1 | | 8/2016 | Ke |
| 2018/0241915 A1 | * | 8/2018 | Guan ............. H04N 5/23296 |

FOREIGN PATENT DOCUMENTS

| | | |
|---|---|---|
| JP | 2016-101441 | 6/2016 |
| KR | 20-1998-0035574 | 9/1998 |
| KR | 10-2014-0099397 | 8/2014 |
| KR | 10-2018-0105105 | 9/2018 |

* cited by examiner

*Primary Examiner* — Alfred J Wujciak
(74) *Attorney, Agent, or Firm* — Ked & Associates, LLP

(57) ABSTRACT

A robot comprises: an outer body having a space formed therein; an interface module mounted on the outer body; a tilting base fastened to the outer body; and a tilting mechanism connected to the tilting base or the outer body to tilt the outer body and the tilting base, wherein the outer body comprises: a first body in which a module accommodation portion accommodating the interface module is formed; a second body forming the space with the first body; a hook unit elastically attaching or detaching one of the first body and the second body to or from the other; and a supporting rib protruding from the other of the first body and the second body and contacting an inner surface of one of the first body and the second body.

18 Claims, 11 Drawing Sheets

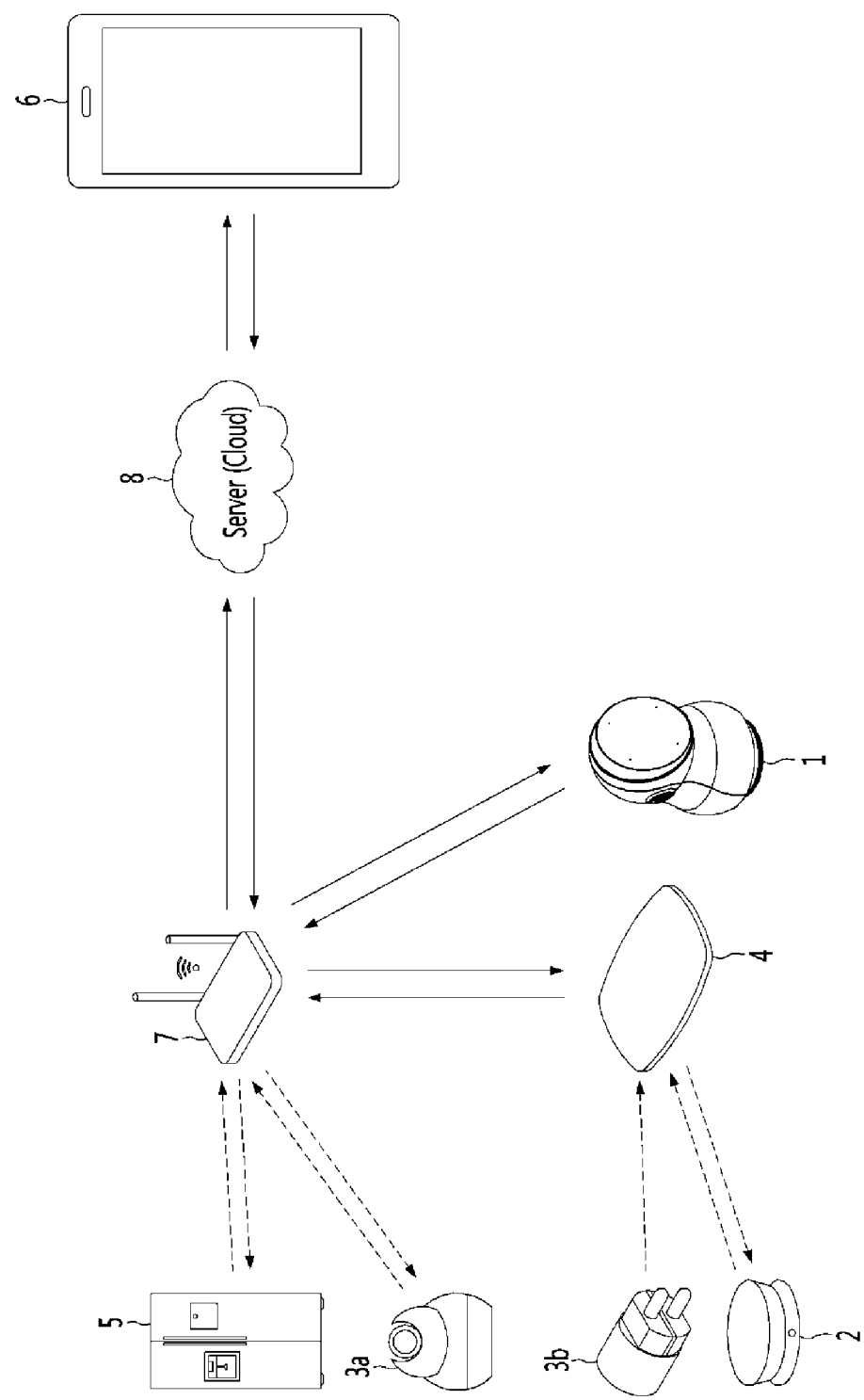
[Fig. 1]

[Fig. 2]
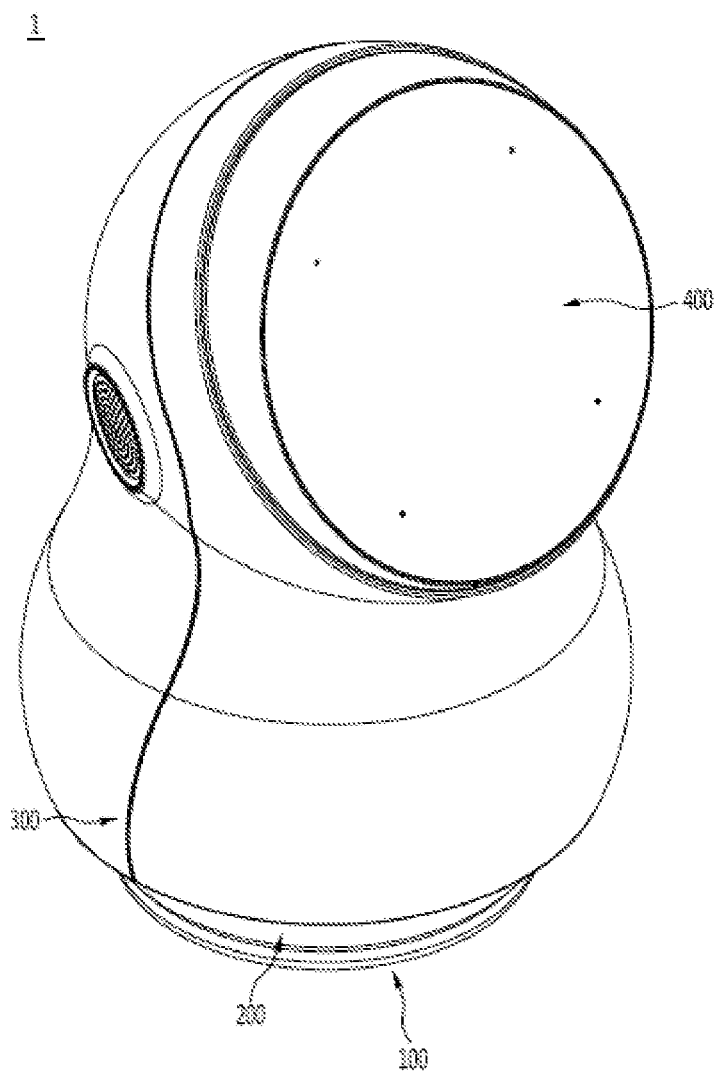

[Fig. 3]
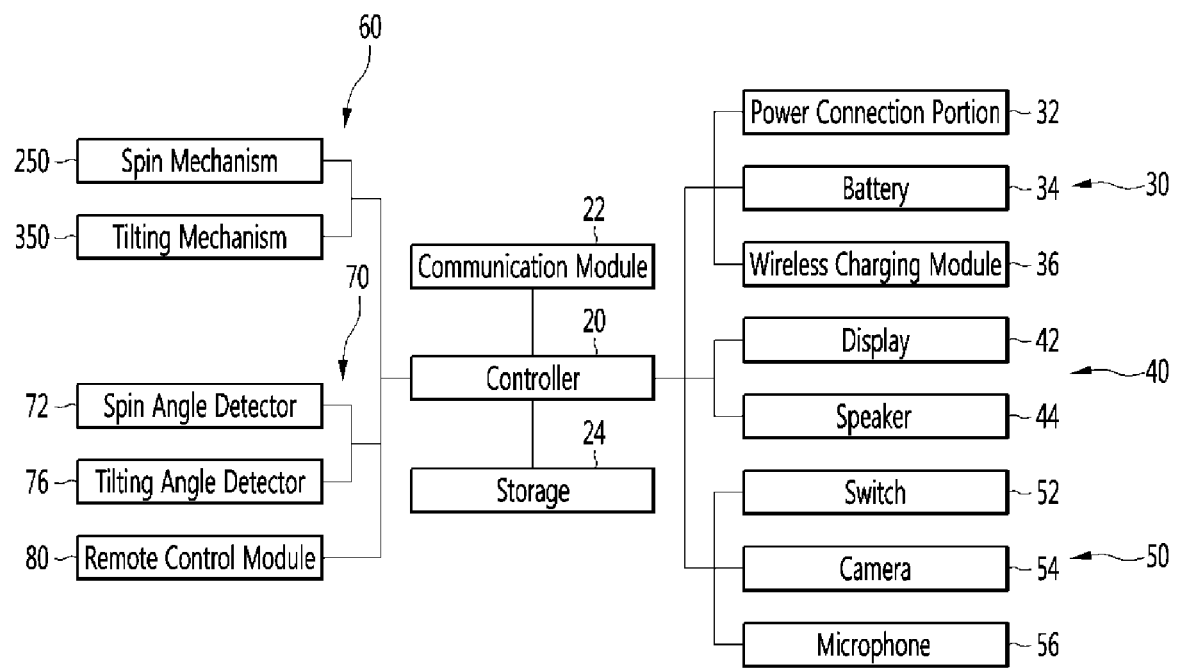

[Fig. 4]
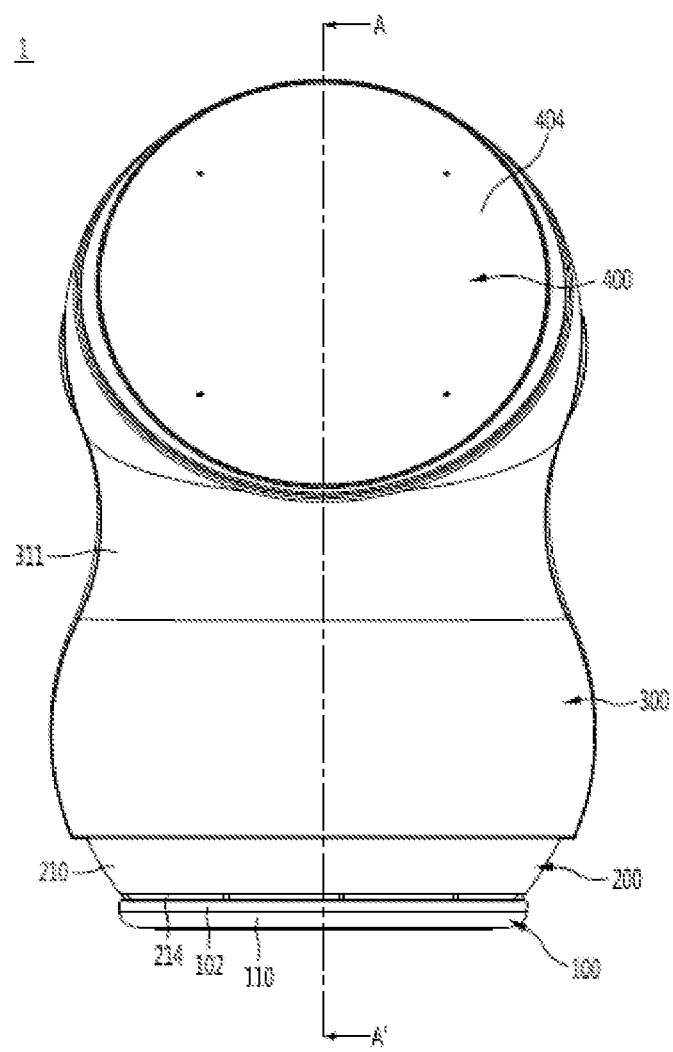

[Fig. 5]
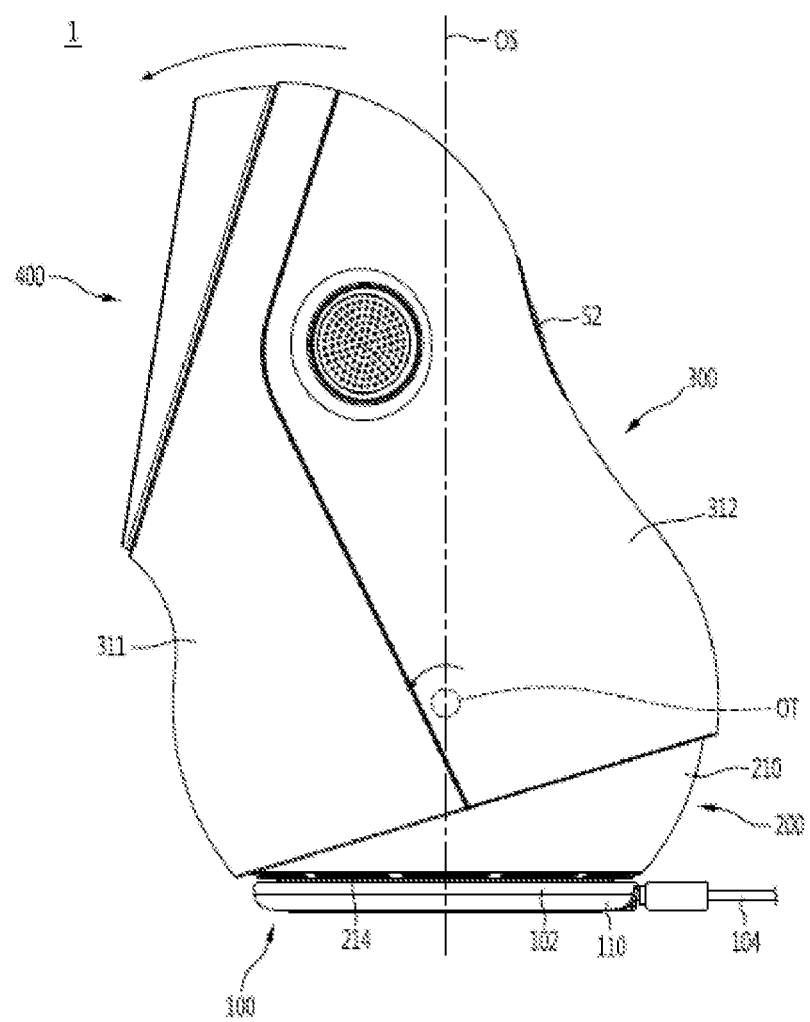

[Fig. 6]
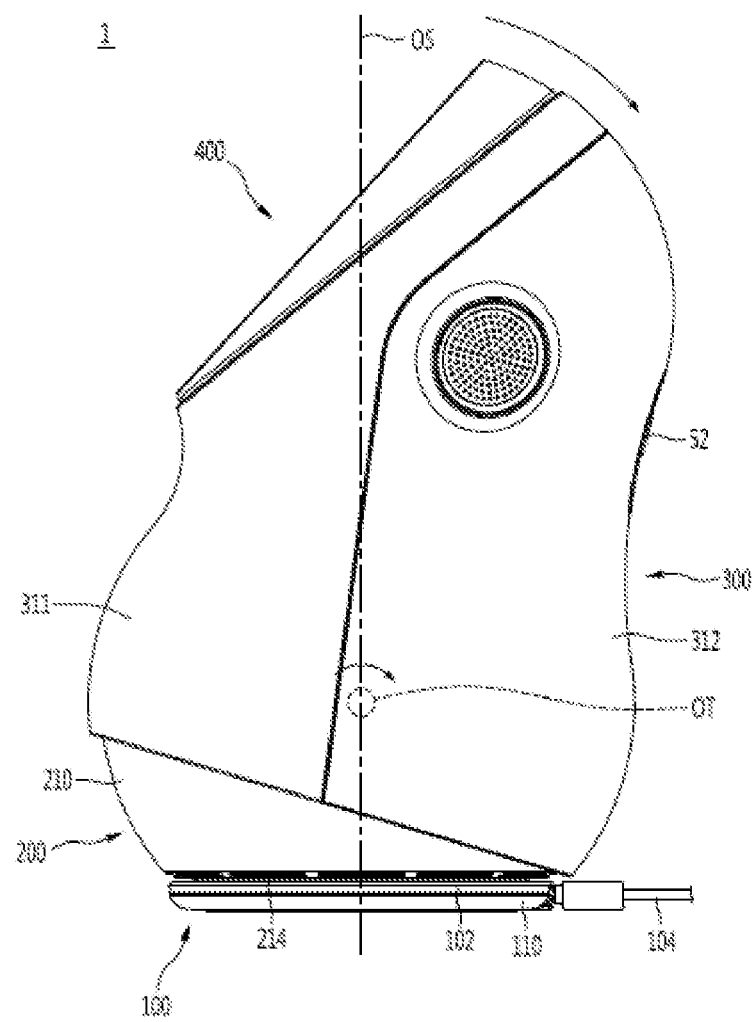

【Fig. 7】
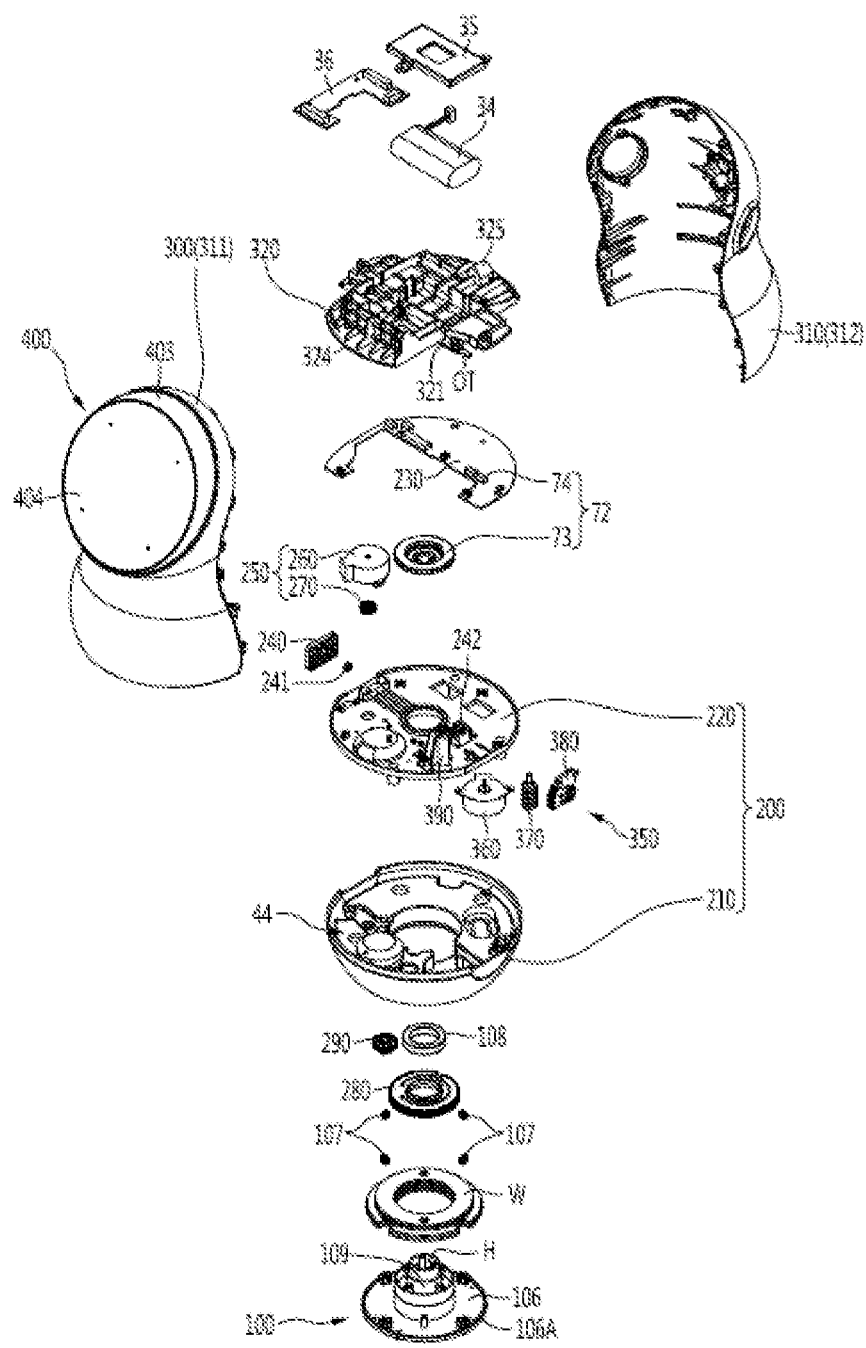

[Fig. 8]
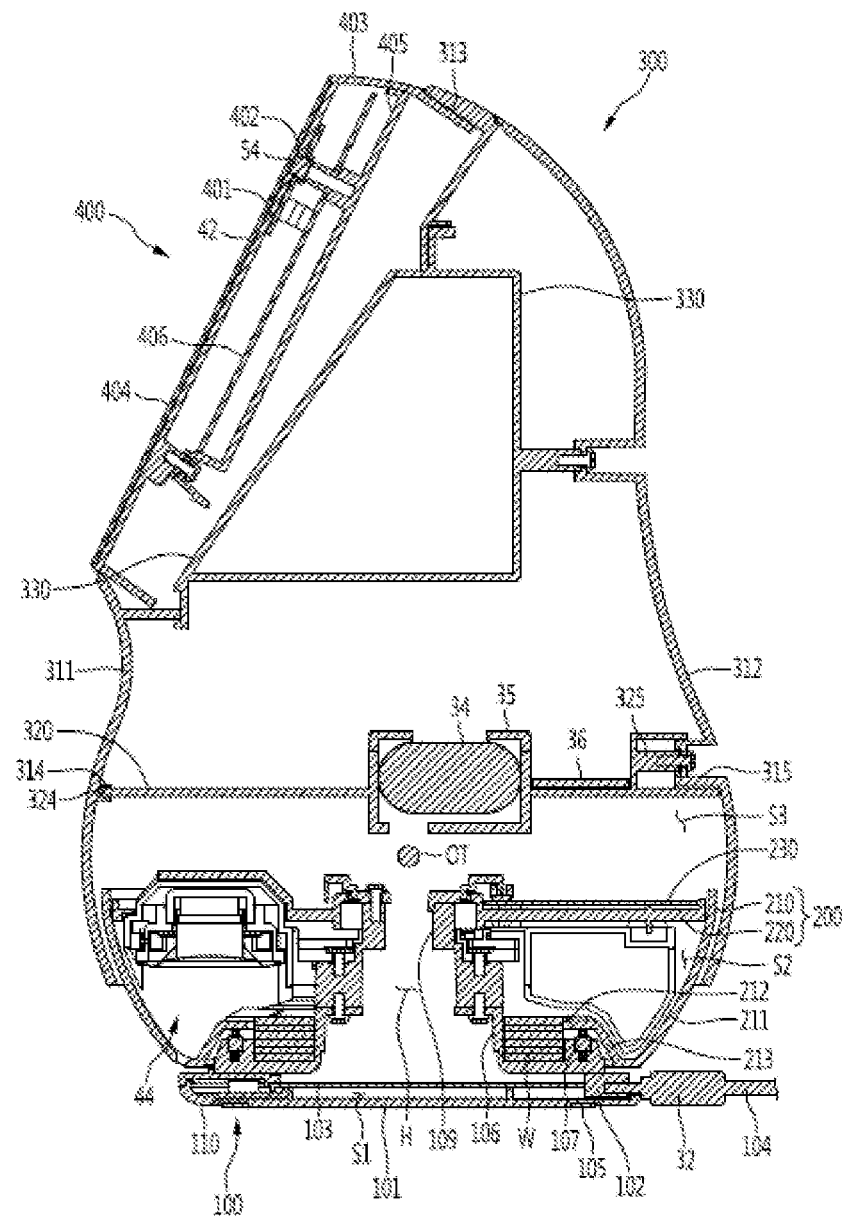

[Fig. 9]
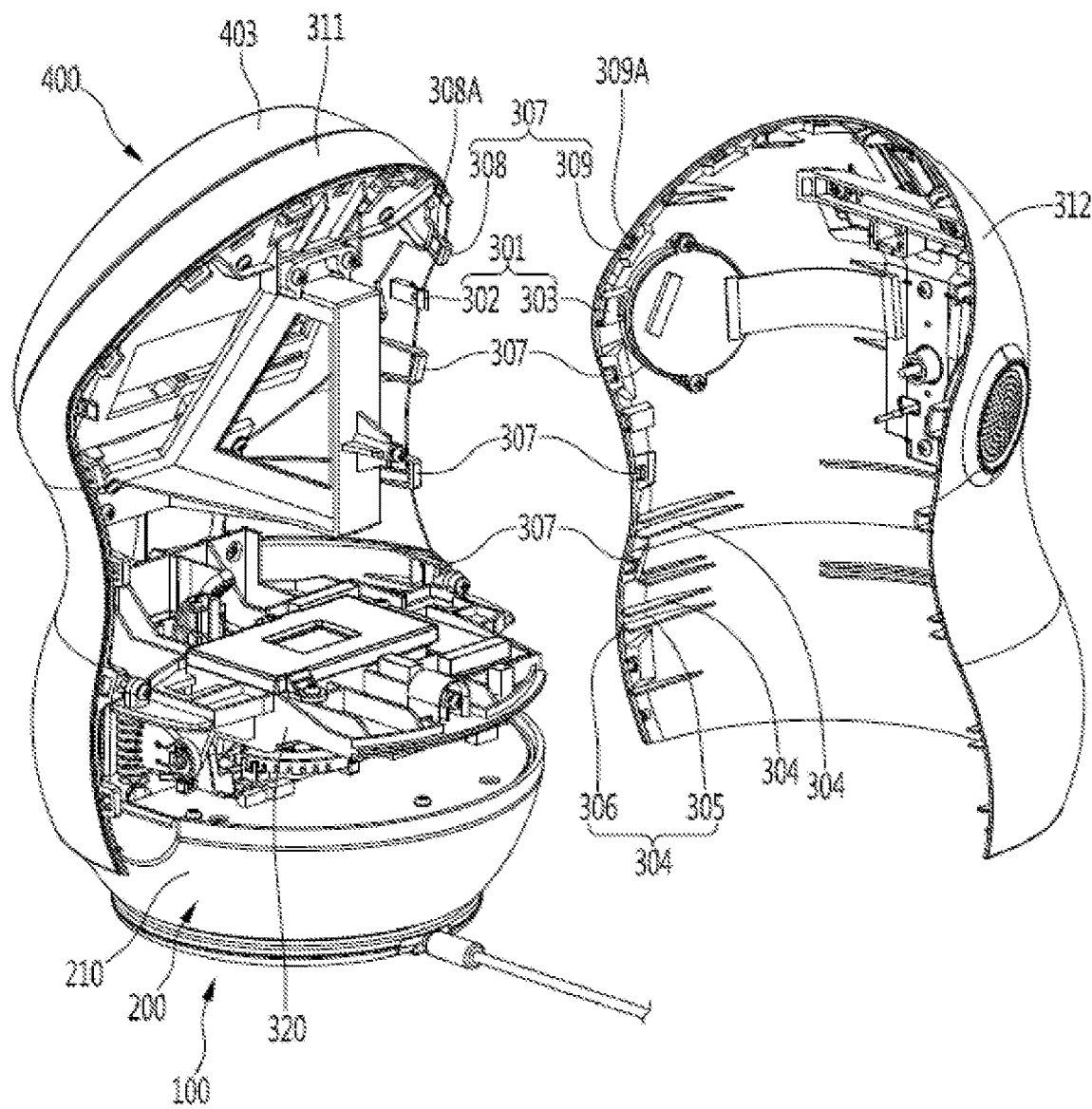

【Fig. 10】
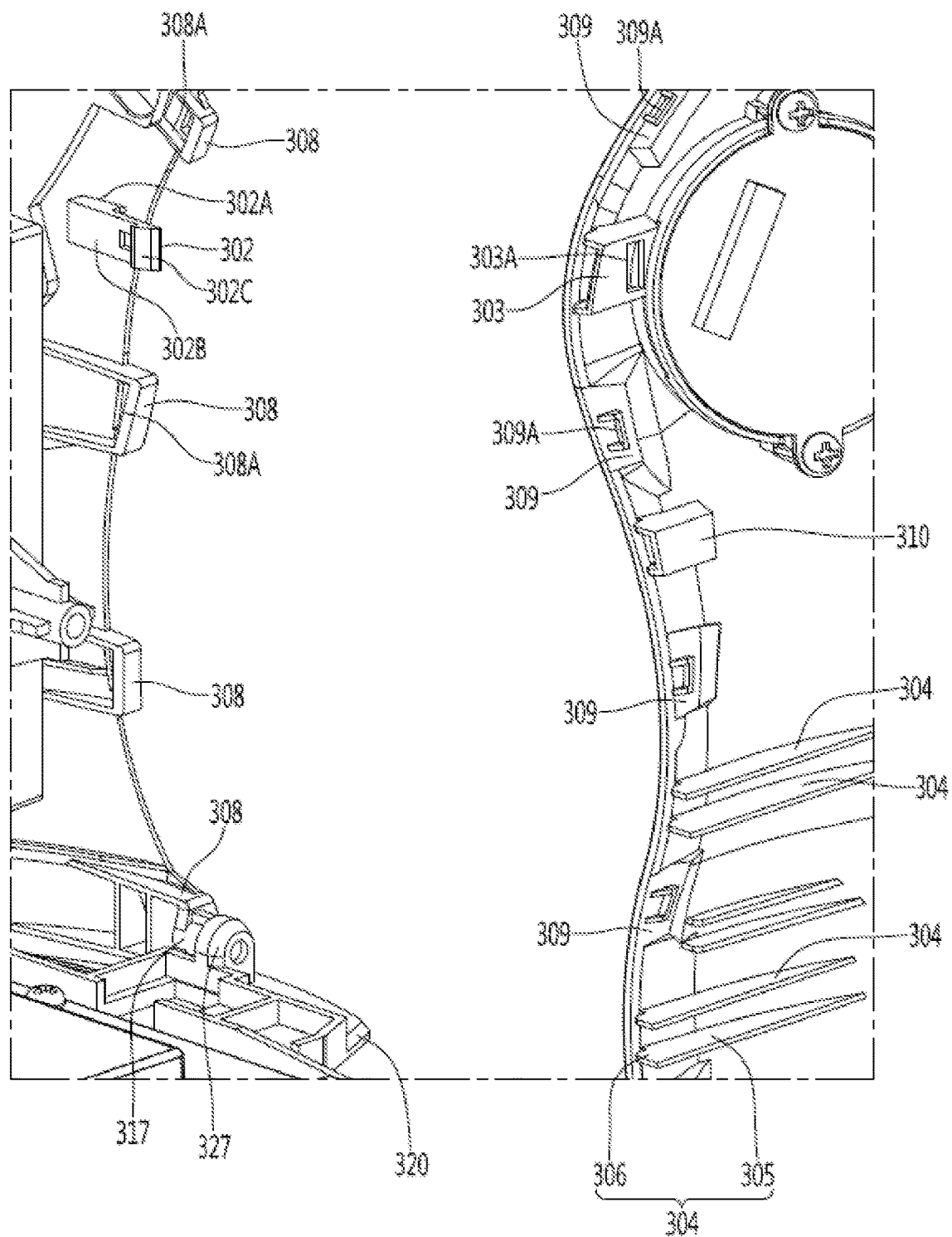

【Fig. 11】
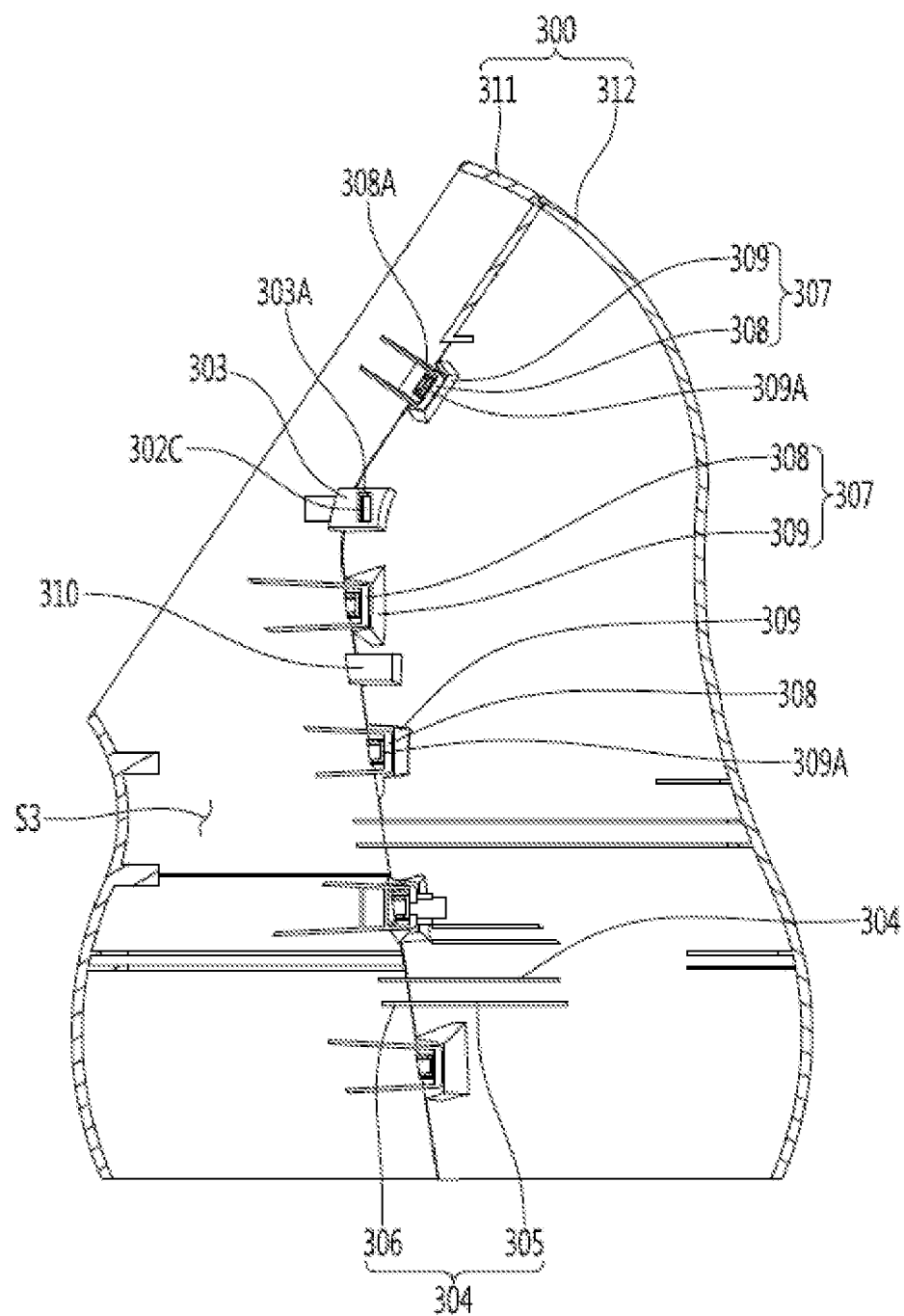

ROBOT

CROSS-REFERENCE TO RELATED PATENT APPLICATIONS

This application is a U.S. National Stage Application under 35 U.S.C. § 371 of PCT Application No. PCT/KR2019/002910, filed Mar. 13, 2019, whose entire disclosures are hereby incorporated by reference.

TECHNICAL FIELD

The present disclosure relates to a robot.

BACKGROUND ART

Robots are machines that automatically process given tasks or operate with their own capabilities. The application fields of robots are generally classified into industrial robots, medical robots, aerospace robots, and underwater robots. Recently, communication robots that can communicate with humans by voices or gestures have been increasing.

The robot may include an interface such as a display for providing visual or auditory information to a user.

Such a robot may include an outer body forming its appearance. The outer body may be composed of a combination of a plurality of members. The members may protect various components disposed inside the outer body in a coupled state.

The robot may be used on a desk, a table, etc., and may be dropped to the floor by unexpected situations. In this case, some of the plurality of members may be pushed or twisted based on the other members of the outer body. In severe cases, some of the plurality of members may be separated from the remaining components of the robot.

DISCLOSURE OF THE INVENTION

Technical Problem

An object of the present disclosure is to provide a robot that may minimize distortion or separation of an outer body by an external impact or drop.

Technical Solution

In one embodiment, a robot includes: an outer body having a space formed therein; an interface module mounted on the outer body; a tilting base fastened to the outer body; and a tilting mechanism connected to the tilting base or the outer body to tilt the outer body and the tilting base, wherein the outer body includes: a first body in which a module accommodation portion accommodating the interface module is formed; a second body forming the space with the first body; a hook unit elastically attaching or detaching one of the first body and the second body to or from the other; and a supporting rib protruding from the other of the first body and the second body and contacting an inner surface of one of the first body and the second body.

The hook unit may be formed on an upper portion of the outer body.

The outer body may further include a plurality of hanger units spaced apart from each of the hook unit and the supporting rib and hanging one of the first body and the second body to the other.

The plurality of hanger units may each include a contact body protruding from the inner surface of one of the first body and the second body to contact the inner surface of the other of the first body and the second body.

An accommodation groove into which the contact body is inserted and accommodated may be formed on the inner surface of the other of the first body and the second body.

A protrusion may protrude from the accommodation groove.

A hanger hole into which the protrusion is inserted and caught may be formed in the contact body.

The hook unit may be formed between an uppermost hanger unit among the plurality of hanger units and another hanger unit closest to the uppermost hanger unit.

The hook unit may include: a hook protruding toward the inner surface of the other of the first body and the second body formed on the inner surface of one of the first body and the second body; and a hook fastening body protruding toward the inner surface of one of the first body and the second body on the inner surface of the other of the first body and the second body, the hook being elastically attached to or detached from the hook fastening body.

The hook may include: a protrusion protruding from the inner surface of one of the first body and the second body; an extension extending from the protrusion toward the inside of the other of the first body and the second body and spaced apart from the inner surface of one of the first body and the second body; and a gradient formed on a side of the extension and having an inclined surface.

A hook hole into which the gradient is inserted and caught may be formed in the hook fastening body.

The hook fastening body may surround side, top, and bottom surfaces of the hook.

The supporting rib may include: a protrusion protruding from the other of the first body and the second body; and a contact extending from the protrusion, disposed in one of the first body and the second body, and contacting the inner surface of one of the first body and the second body.

A length of the protrusion may be longer than a length of the contact.

A length of the contact may be 3 mm to 10 mm in a horizontal direction.

The supporting rib may be closer to a lower end of the outer body than an upper end of the outer body.

A support body of a polygonal shape contacting the inner surface of one of the first body and the second body and disposed higher than the supporting rib may protrude from the other of the first body and the second body.

A first fastening boss may be formed in the first body or the second body.

A second fastening boss coinciding with the first fastening boss and fastened to the first fastening boss by a fastening member may be formed in the tilting base.

The first fastening boss may protrude toward the other of the first body and the second body.

The second fastening boss may protrude upward from the tilting base.

The first fastening boss and the second fastening boss may coincide with each other in a horizontal direction.

Advantageous Effects

According to an embodiment of the present disclosure, since a first body and a second body are confined by engaging each other in a plurality of directions by a hook unit and a supporting rib, one of the first body and the second body may not be pushed relative to the other one and the first body by external impact and the first body and the second body may be firmly held together.

In addition, since the supporting rib supports the outer body in the horizontal direction, the outer body does not slop and deform by external force generated instantaneously during the drop, and thus may maintain the original shape.

In addition, since one of the first body and the second body is not pushed or twisted relative to the other one by the supporting rib, the engagement state of the hook unit may be firmly maintained, and the engagement state of the first body and the second body may be reliably maintained.

In addition, one of the first body and the second body may be hooked to the other one by the hanger unit. Since the hook unit is fastened in a hanging state, a operation of fastening the first body and the second body is easy.

Further, when the first body and the second body is fastened, the supporting unit guides one of the first body and the second body, the accurate assembly position of the first body and the second body may easily coincide with each other, and the operation of fastening the first body and the second body may be easy.

BRIEF DESCRIPTION OF THE DRAWINGS

FIG. 1 is a view illustrating an example of a network system to which a robot according to an embodiment is applied.

FIG. 2 is a perspective view of the robot according to the embodiment.

FIG. 3 is a control block diagram of the robot according to the embodiment.

FIG. 4 is a front view of the robot according to the embodiment.

FIG. 5 is a side view illustrating a state in which an outer body according to an embodiment is tilted forward.

FIG. 6 is a side view illustrating a state in which the outer body according to the embodiment is tilted rearward.

FIG. 7 is an exploded perspective view of the robot according to the embodiment.

FIG. 8 is a cross-sectional view taken along line A-A' of FIG. 4.

FIG. 9 is a perspective view illustrating a state in which the outer body according to the embodiment is disassembled.

FIG. 10 is an enlarged exploded perspective view of a hook unit, a supporting rib, and a hanger unit according to an embodiment.

FIG. 11 is a view illustrating the inner surface of the outer body when the first body and the second body according to the embodiment are fastened.

BEST MODE

Hereinafter, specific embodiments of the present disclosure will be described in detail with reference to the accompanying drawings.

FIG. 1 is a view illustrating an example of a network system to which a robot according to an embodiment is applied.

As illustrated in FIG. 1, the network system to which the robot is applied may include a robot 1 that transmits information via a wired network or a wireless network, accessories 2, 3a, and 3b, a gateway 4, a terminal 6, an access point 7, and a server 8.

The network may be established based on technologies such as Wi-Fi, Ethernet, Zigbee, Z-wave, or Bluetooth.

The robot 1, the accessories 2, 3a, and 3b, the gateway 4, and the access point 7 may include a communication module connectable to the network according to a predetermined communication protocol.

A communication module included in each of the devices 1, 2, 3a, 3b, 4, and 7 constituting the network system may be determined according to the configuration of the network, and a plurality of communication modules may be provided in the device according to a communication method between each device and the network or between the devices.

The robot 1 may be connected to the access point 7 via a wired (e.g., Ethernet) or wireless (e.g., Wi-Fi) communication. Communication between the robot 1 and the accessories 2 and 3b may be achieved via the gateway 4 and the access point 7. As another example, communication between the robot 1 and the accessory 3a or between the other devices 5 may be achieved via the access point 7.

Specifically, a signal transmitted from the accessories 2 and 3b may be transmitted to the robot 1 via the gateway 4 and the access point 7 in sequence, and a signal transmitted from the robot 1 may be transmitted to the accessories 2 and 3b via the access point 7 and the gateway 4 in sequence. As another example, a signal transmitted from the accessory 3a or other device 5 may be transmitted to the robot 1 via the access point 7, and a signal transmitted from the robot 1 may be transmitted to the accessory 3a or other device 5 via the access point 7.

For example, information acquired by sensor modules of the accessories 2, 3a, and 3b may be transmitted to the server 8, the terminal 6, or the robot 1 via the network. In addition, a signal transmitted from the server 8, the robot 1, or the terminal 6 so as to control the sensor module, a control module, or a remote control module may be transmitted to the accessory 2. The transmission of such signals may be performed via the gateway 4 and/or the access point 7.

Communication between the accessories 2, 3a, and 3b and the robot 1 is possible just by the gateway 4 and the access point 7. For example, even when a home network is disconnected from an external communication network such as the Internet, communication between the accessories 2, 3a, and 3b and the robot 1 is possible.

When the robot 1 is connected to the server 8 via the access point 7, information transmitted from the robot 1 or the accessory 2 may be stored in the server 8. The information stored in the server 8 may be received by the terminal 6 connected to the server 8.

In addition, the information transmitted from the terminal 6 may be transmitted to the robot 1 or the accessory 2 via the server 8. Since a smart phone, which is a recently widely used terminal, provides a convenient user interface (UI) based on graphics, it is possible to control the robot 1 and/or the accessory 2 via the UI or to process and display information received from the robot 1 and/or the accessory 2. In addition, functions that can be implemented through the robot 1 and/or the accessory 2 may be extended by updating applications installed on the smart phone.

Meanwhile, the terminal 6 and the robot 1 may directly communicate with each other regardless of the server 8. For example, the robot 1 and the terminal 6 may directly communicate with each other by using a Bluetooth scheme.

Meanwhile, it is also possible to control the accessory 2 or display and to process the information received from the accessory 2 with the robot 1 alone, without using the terminal 6.

The network system may be configured without the gateway 4, and the robot 1 may also function as the gateway 4.

The accessories 2, 3a, and 3b may include at least one communication module for connection with the network. The communication module may communicate with a predetermined network.

The accessories 2, 3a, and 3b may include a sensor module for detecting a predetermined ambient environment. The accessories 2, 3a, and 3b may include a control module that performs a specific function that affects the surrounding environment. The accessories 2, 3a, and 3b may include a remote control module that transmits an optical signal (for example, an infrared signal) for controlling a predetermined peripheral device.

The accessories 2, 3a, and 3b with the sensor module may be devices including a pressure sensor, a humidity sensor, a temperature sensor, a radiation detection sensor, a heat detection sensor, a gas detection sensor, an air quality sensor, an electronic nose sensor, a healthcare sensor, a biometric sensor, a sleep sensor (for example, the sleep sensor is attached to a user's pajamas or underwear to detect snoring, apnea, tossing, etc. while the user is sleeping), a proximity sensor, an illuminance sensor, an acceleration sensor, a magnetic sensor, a gravity sensor, a gyroscope sensor, a motion sensor, an RGB sensor, an infrared (IR) sensor, an ultrasonic sensor, a remote sensor, an SAR, a radar, and a light sensor (for example, a video sensor, an image sensor, etc.).

The accessories 2, 3a, and 3b with the control module may includes smart lighting for controlling illumination, a smart plug for controlling application and degree of power, a smart temperature regulator for controlling the operation and intensity of a boiler or an air conditioner, and a smart gas lock for controlling shutoff of gas.

The accessories 2, 3a, and 3b with the remote control module may include an infrared LED or the like for emitting an IR signal to a remote controllable household appliance or the like.

The accessories (for example, 3a and 3b) may be installed only for the purpose set to perform a predetermined performance. For example, the accessory 3a is a video camera, and the accessory 3b is a smart plug.

The accessory 2 according to the embodiment may be provided so as to be installed at any position desired by the user. In addition, the accessory 2 may be provided so as to be utilized for various purposes. For example, the accessory 2 may be attached to an external object such as a household appliance, a door, a window, or a wall.

The gateway 4 may mediate communication between one or more accessories 2 and 3b and the access point 7. The gateway 4 may communicate with the accessory 2 by wireless. The gateway 4 communicates with the access point 7 by wire or wireless. For example, the communication between the gateway 4 and the access point 7 may be based on Ethernet or Wi-Fi.

The access point 7 may be connected to the server 8 via wired or wireless communication. The server 8 maybe connected via the Internet. The access point 7 may communicate with the server 8 through various terminals 6 connected to the Internet. The terminal 6 may be a mobile terminal such as a personal computer (PC) or a smart phone.

The accessories 2 and 3b may be provided so as to communicate with the gateway 4. As another example, the accessory 3a may be provided so as to directly communicate with the access point 7 without passing through the gateway 4.

The access point 7 may be provided so as to directly communicate with the accessory 3a or other device 5 equipped with the communication module without passing through the gateway 4. These devices 5 and 3a are preferably provided with a Wi-Fi communication module so as to directly communicate with the access point 7 without passing through the gateway 4.

FIG. 2 is a perspective view of a robot according to an embodiment, FIG. 3 is a control block diagram of the robot according to the embodiment, FIG. 4 is a front view of the robot according to the embodiment, FIG. 5 is a side view illustrating a state in which an outer body according to an embodiment is tilted forward, and FIG. 6 is a side view illustrating a state in which the outer body according to the embodiment is tilted rearward.

The robot may include a base 100 and an outer body 300. The robot may include a driver 60 that performs motion of the robot. The driver 60 may be connected to the outer body 300 to perform a three-dimensional motion of the outer body 300.

The driver 60 may be disposed on the base 100 and supported by the base 100. The driver 60 may rotate and tilt the outer body 300. The driver 60 may rotate the outer body 300, may tilt the outer body 300, and may tilt the outer body 300 while rotating the outer body 300.

The driver 60 may include a spin body 200 disposed on the base 100 to be spinable, a spin mechanism 250 for rotating the spin body 200, and a tilting mechanism 350 disposed on the spin body 200 to tilt the outer body 300.

The spin mechanism 250 and the tilting mechanism 350 may be driven independently, may be driven simultaneously, and may cause the outer body 300 to perform a complex motion during simultaneous driving.

The spin mechanism 250 may cause the spin body 200 to rotate about the base 100. The spin body 200 may be disposed to rotate about a rotational axis OS extending in the vertical direction, and the spin mechanism 250 may rotate the spin body 200 about the rotational axis OS.

The tilting mechanism 350 may tilt the outer body 300 about a tilting shaft OT. The outer body 300 may be disposed to be tilted about the tilting shaft OT extending in the horizontal direction. The tilting mechanism 350 may tilt the outer body 300 such that the outer body 300 is inclined to one side with respect to the spin body 200.

The tilting mechanism 350 may be mounted on the spin body 200. When the spin body 200 is rotated by the spin mechanism 250, the tilting mechanism 350 and the outer body 300 may rotate together with the spin body 200.

The robot may include at least one interface 42, 44, 54, and 56 installed on at least one of the spin body 200 or the outer body 300.

The robot 1 may include a controller 20 for controlling the robot 1. The controller 20 may be provided in the server 8 or the terminal 6 so as to control the robot 1 through the network.

The robot 1 may include a communication module 22 for communicating with the network. The communication module 22 may include a Wi-Fi module, a Bluetooth module, a Zigbee module, and a Z-wave module. The communication module 22 may be changed according to a communication scheme of a device to be directly communicated.

The communication module 22 may communicate with at least one of the access point 7, the gateway 4, the accessories 2, 3a, and 3b, the server 8, or the terminal 6 constituting the network system.

Information acquired from the input unit 50 through the communication module 22 may be transmitted over the network. Information may be received by the robot 1 on the network through the communication module 22, and the controller 20 may control the output unit 40 or the driver 60 based on the received information.

The robot 1 may further include a storage 24 for storing information acquired through a driving detector 70. The storage 24 may store information received from the network through the communication module 22. The storage 24 may store commands inputted from the input unit 50.

The robot 1 includes a power supply device 30 for supplying power to the respective components of the robot 1. The power supply device 30 may include a power connection portion 32 capable of connecting an external wired power cable. The power connection portion 32 may be implemented by a socket. The power supply device 30 may include a battery 34. The battery 34 may be provided for charging. The power supply device 30 may further include a charging module, e.g., a wireless charging module 36 capable of charging the battery 34.

The robot 1 may include the output unit 40. The output unit 40 may output the information to the outside visually or audibly.

The output unit 40 includes a display 42 for outputting information visually. The output unit 40 may include a speaker 44 for outputting information audibly.

The robot 1 may include the input unit 50. The input unit 50 may receive a command for controlling the robot 1. The input unit 50 may be configured to allow a user to directly input a command without passing through the communication module 22. The input unit 50 may receive a command for controlling the accessory 2.

The input unit 50 may include a switch 52. The switch 52 may include a power switch for turning on/off the power of the robot 1. The switch 52 may include a function switch for setting the function of the robot 1, pairing with a predetermined network, pairing with the terminal 6, and the like. It is possible to preset various commands to the robot 1 through a combination of the pressing time of the function switch and/or the number of times of continuously pressing the function switch. The switch 52 may include a reset switch capable of resetting a predetermined setting of the robot 1. The switch 52 may include a sleep switch for switching the robot 1 to a power-saving state or a non-output state.

The input unit 50 may include a sensor, e.g., a camera 54 for sensing an external visual image. The camera 54 may acquire an image for recognizing a user. The camera 54 may acquire an image for recognizing the direction of the user. Image information acquired by the camera 54 may be stored in the storage 24.

The input unit 50 may include a touch type display.

The input unit 50 includes a microphone 56 for sensing an external sound. When the robot 1 is provided with the microphone 56, the controller 20 of the robot 1 may recognize the user's voice inputted through the microphone 56 and extract a command. In order to recognize the position of the sound source, the input unit 50 may include a plurality of microphones 56. The sound information acquired by the microphone 56 or the position information about the user may be stored in the storage 24.

The robot 1 may include a direction sensor for sensing the direction of the user with respect to the robot 1. The direction sensor may include the camera 54 and/or the plurality of microphones 56.

The robot 1 may give the same feeling as a living creature by performing the motion of the robot 1 together with the output contents of the display 42 of the robot 1 or the output contents of the speaker 44 of the robot 1. Just as the gesture (motion) or eye contact play a big role in human-human communication, the motion of the robot 1 by the driver 60 may efficiently recognize the output contents of the output unit 40 to the user. The motion of the robot 1 by the driver 60 may add emotional elements in the communication process between the user and the robot 1.

The robot 1 includes a driving detector 70 capable of detecting a current motion state of the driver 60. The driving detector 70 includes a spin angle detector 72 that senses a rotating angle of the spin body 200 about the rotational axis OS. When the robot 1 further includes the outer body 300 and the tilting mechanism 350, the driving detector 70 may include a tilting angle detector 76 that senses a rotating angle (inclined angle) of the outer body 300 about the tilting shaft OT with respect to the spin body 200.

The controller 20 may control the communication module 22 based on control information received from the input unit 50. The controller 20 may control the communication module 22 to store the information received from the network in the storage 24. The controller 20 may perform a control such that the information stored in the storage 24 is transmitted to the network via the communication module 22.

The controller 20 may receive control information from the input unit 50. The controller 20 may perform a control such that the output unit 40 outputs predetermined information. The controller 20 may perform a control such that the driver 60 operates together with the information output of the output unit 40.

For example, the controller 20 may recognize the user based on the image acquired by the camera 54, and may operate the output unit 40 and the driver 60 based on the recognition. When the recognized user matches a preset user, the controller 20 may display a smile image on the display 42 and operate the tilting mechanism 350 to tilt the outer body 300 in the vertical or horizontal direction.

As another example, the controller 20 may recognize the face position of the user based on the direction sensor, and may operate the output unit 40 and the driver 60 based on the recognition result. The controller 20 may display predetermined information on the display 42 and operate the spin mechanism 250 such that the display 42 operates to direct the user's face. The controller 20 may perform a control such that the spin body 200 rotates so as to switch the image output direction of the interface module 400 to the direction of the user detected by the direction sensor.

The controller 20 may control whether to operate the driver 60 based on the control information received from the network via the communication module 22. The controller 20 may control the driver 60 based on the control information received from the input unit 50. The controller 20 may control the driver 60 based on the control information stored in the storage 24.

The robot 1 may include a remote control module 80. The remote control module 80 may transmit an optical signal (e.g., an infrared signal) for controlling a predetermined peripheral device. The predetermined peripheral device may refer to a peripheral device capable of remote control. For example, the predetermined peripheral device may be a washing machine, a refrigerator, an air conditioner, a robot cleaner, a TV, and the like, which can be controlled by a remote controller. The remote control module 80 may include a light emitter for emitting a predetermined optical signal for controlling the predetermined peripheral device. For example, the light emitter may be an LED that emits infrared rays. The direction in which the remote control module 80 irradiates the optical signal may be changed according to the operation of the robot 1. In this manner, the optical signal irradiation direction of the remote control module 80 may be changed in the direction of the specific device requiring the remote control, so as to control the specific device by the optical signal.

The display 42, the speaker 44, the camera 54, and the microphone 56, which constitute the robot 1, may be interfaces for helping communication between the human and the robot 1, these interfaces may be mounted on the spin body 200 and may be rotatable together with the spin body 200 when the spin body 200 rotates, and these interfaces may be mounted on the outer body 300 and may be tilted together with the outer body 300 when the outer body 300 is tilted.

In the communication robot 1, the interfaces such as the display 42, the speaker 44, the camera 54, and the microphone 56 may be distributed in the spin body 200 and the outer body 300.

The robot 1 may include an interface module 400 including at least one of the interfaces such as the display 42, the speaker 44, the camera 54, or the microphone 56, and the interface module 400 may be mounted on the outer body 300, may spin together with the outer body 300 during the rotation of the spin body 200, and may tilt together with the outer body 300 during the tilting of the outer body 300.

The battery 34, the display 42, the speaker 44, the camera 54, the microphone 56, the spin mechanism 250, the tilting mechanism 350, and the like are preferably supported to the spin body 200 or the outer body 300 in consideration of the weights or sizes thereof, and are preferably arranged such that the entire center of gravity of the robot 1 is minimized.

FIG. 7 is an exploded perspective view of the robot according to the embodiment, and FIG. 8 is a cross-sectional view taken along line A-A of FIG. 4.

The base 100 may rotatably support the spin body 200 and may support the load transmitted from the spin body 200. When the robot further includes the outer body 300 and the interfaces, the loads of the outer body 300 and the interfaces may be transmitted to the base 100 through the spin body 200.

Hereinafter, the base 100 will be described in detail with reference to FIGS. 7 and 8.

The base 100 may include a combination of a plurality of members. The base 100 may include a lower base 101, and an upper base 102 disposed on the lower base 101.

A PCB accommodation space for accommodating a base PCB 103 may be formed in the base 100. The PCB accommodation space S1 may be formed between the lower base 101 and the upper base 102, or may be formed inside the upper base 102.

The base PCB 103 may be accommodated in the PCB accommodation space S1 formed in the base 100 and may be protected by the base 100.

The base PCB 103 may be directly connected to the power connection portion 32 to which the power cord 104 is connected, or may be connected to the power connection portion 32 through a separate wire.

A light source such as an LED may be disposed in the base PCB 103. In this case, the base 100 may function as a lighting device, and the base 100 may function as an interface for providing visual information to the outside.

The base 100 may further include a base decor member 110 through which light emitted from the light source such as the LED is transmitted.

The base 100 may further include a non-skid member 105 disposed on the bottom surface of the lower base 101. The non-skid member 105 may be formed in a ring shape or a disk shape, and may be attached to the bottom surface of the lower base 101. The non-slip member 105 may be a non-slip mat having a large frictional force with the ground.

The robot may include at least one rolling bearing 107. The rolling bearing 107 is installed on the base 100 to support the spin body 200.

The base 100 may include a bearing supporter 106 for supporting the rolling bearing 107.

The rolling bearing 107 may have an inner ring connected to the bearing supporter 106 through a support shaft, and the outer ring may rotate along the inner ring.

A plurality of rolling bearings 107 may be provided in the base 100. The plurality of rolling bearings 107 may support the spin body 200, particularly the spin housing 210, in a state of being spaced apart from the base 100.

The plurality of rolling bearings 107 may be disposed along a virtual circle, and the plurality of rolling bearings 107 may transmit the load acting on the spin body 200 to the base 100, particularly the bearing supporter 106 in a distributed manner.

A weight body W capable of increasing the weight of the base 100 may be disposed in the base 100. The weight body W is an object having a larger weight than a volume, and may reduce the entire center of gravity of the robot 1 as much as possible and help the robot 1 not to overturn. The weight body W may be disposed in the bearing supporter 106. A plurality of weight bodies W may be stacked in the vertical direction.

An upper bearing 108 for rotatably supporting the spin body 200 may be disposed in the base 100. The base 100 may further include a fixed shaft 109 on which the upper bearing 108 is mounted. The fixed shaft 109 may be a rotational center axis of the spin body 200, and the center axis of the fixed shaft 109 may be the rotational axis OS. The fixed shaft 109 may be disposed on the top side of the bearing supporter 106. The fixed shaft 109 may be coupled to the bearing supporter 106 by a fastening member such as a screw.

The upper bearing 108 may be mounted on the fixed shaft 109 so as to be disposed above the spin driven gear 280 to be described later. The upper bearing 108 may be disposed so as to surround the outer circumference of the upper portion of the fixed shaft 109.

The upper bearing 108 may be an upper rolling bearing disposed between the fixed shaft 109 and a spin cover 220 to be described later.

The upper bearing 108 may include an inner ring fixed to the outer circumference of the fixed shaft 109, an outer ring fixed to the upper bearing housing 221 formed in the spin cover 220, and a rolling member such as a ball or a roller disposed between the inner ring and the outer ring.

The upper bearing 108 may be disposed above the spin driven gear 280 and spaced apart from the spin driven gear 280, and may rotatably support the spin cover 220. The shaft center of the upper bearing 108 may be a vertical axis, and the shaft center of the upper bearing 108 may coincide with the rotational axis OS.

The spin driven gear 280 may be mounted on the fixed shaft 109, and the spin driven gear 280 may be mounted on the fixed shaft 109 by a fastening member such as a screw. The spin driven gear 280 may have a double structure of an upper gear and a lower gear, and the upper gear and the lower gear may be fixed to each other. The spin driven gear 280 may be guided to rotate the spin body 200 in a state of being fixedly mounted on the fixed shaft 109. The spin body 200 may be rotated along the locus of the spin driven gear 280.

A through-hole (H) through which a wire or the like can pass may be formed in the fixed shaft 109. The through-hole H may be formed to pass through the fixed shaft 109 in the vertical direction.

The wire or the like passing through the through-hole H of the fixed shaft 109 may connect the base PCB 103 to at least one of a PCB 230 mounted on the spin body 200, a PCB 36 mounted on the outer body 300, an interface PCB 406 of the interface module 400, or the battery 34.

Hereinafter, the spin body 200 will be described.

The spin body 200 may be supported to be spinable on the base 100. The spin body 200 may be mounted on the rolling bearing 107, and may spin about the fixed shaft 109 in a state of being mounted on the rolling bearing 107.

The spin body 200 may include a combination of a plurality of members, and the spin body 200 may include a spin housing 210 having a space S2 formed therein and a spin cover 220 covering the space S2.

At least one interface may be accommodated in the space S2 of the spin body 200. The interface may be a speaker 44 accommodated in the spin body 200. The speaker 44 may be disposed below the spin cover 220 and may be protected by the spin cover 220, and the spin housing 210 and the spin cover 220 may function as a protective cover that protects the speaker 44. The spin body 200 may be an interface housing that protects the interface accommodated in the space S2.

Part of the spin housing 210 may be exposed to the outside. Part of the spin housing 210 may be seen through the lower end of the outer body 300, and the spin housing 210 may constitute part of the appearance of the robot.

The spin housing 210 may have a shape in which the top surface thereof is opened and the size thereof is reduced downward. The outer surface of the spin housing 210 may be convex toward the outside.

The spin housing 210 may include an outer hollow body 211 and an inner hollow body 213.

The outer hollow body 211 may have a space S2 in which the speaker 44 can be accommodated, and the size of the outer hollow body 211 may be reduced toward the lower side.

The inner hollow body 213 may extend from the lower end of the outer hollow body 211 toward the space S2 formed inside the outer hollow body 211.

A base through-hole 212 through which part of the base 100 passes may be formed at the center of the inner hollow body 213.

The spin cover 220 may have a plate shape as a whole, or may be mounted on the upper end of the spin housing 210. The spin cover 220 may be inserted into the spin housing 210 and coupled to the spin housing 210 inside the spin housing 210.

Tilting shaft supporters 240 and 242 (FIG. 7) for rotatably supporting the tilting shaft OT may be disposed on the spin cover 220. The tilting shaft supporters 240 and 242 may be disposed on the top surface of the spin cover 220. The pair of tilting shaft supporters 240 and 242 may be arranged so as to be spaced apart in the horizontal direction, and the tilting shaft OT may be rotatably supported to the tilting shaft supporters 240 and 242 through the bearing 241.

The robot may further include the PCB 230 (see FIGS. 7 and 8) disposed on the top surface of the spin cover 220. The PCB 230 may be smaller than the spin cover 220 and may cover part of the top surface of the spin cover 220. The PCB 230 may be horizontally disposed on the top surface of the spin cover 220. The PCB 230 may be a rotation PCB mounted on the spin cover 220 and rotated together with the spin cover 220.

The PCB 230 may control at least one electrical component mounted on the spin cover 220. For example, the PCB 230 may be a motor control PCB for controlling the spin motor 260 and the tilting motor 360.

Hereinafter, the spin mechanism 250 will be described.

The spin mechanism 250 may be connected to the spin body 200 and rotate the spin body 200.

The spin mechanism 250 includes a spin motor 260, a spin driving gear 270, and a spin driven gear 280.

The spin motor 260 may be disposed in the spin cover 220, and the driving shaft may protrude from the lower portion of the spin motor 260.

The spin motor 260 may be disposed on the top surface of the spin cover 220. The spin motor 260 may be fastened to the spin cover 220 by a fastening member such as a screw. The driving shaft of the spin motor 260 may be vertically disposed below the spin motor 260. The driving shaft of the spin motor 260 may protrude toward the space S2.

The spin cover 220 may be provided with a vertical through-hole through which at least one of the driving shaft of the spin motor 260 or the spin driving gear 270 passes. At least one of the driving shaft of the spin motor 320 or the rotational shaft of the spin driving gear 270 may be disposed in the through-hole of the spin cover 220.

The spin driving gear 270 may be engaged with the driving shaft of the spin motor 260 in the space S2. The spin driving gear 270 may be rotated inside the spin body 200 and may be protected by the spin body 200. The spin driving gear 270 may be suspended from the driving shaft of the spin motor 260. The spin driving gear 270 may be rotated by the spin motor 250 below the bottom surface of the spin cover 220.

The spin driven gear 280 may be fixed to the base 100. The spin driven gear 280 may be a fixed gear that is fixedly mounted to the fixed shaft 109 of the base 100.

In the spin mechanism 250, the spin driving gear 270 may be engaged with the spin driven gear 280. In this case, the spin driving gear 270 may be rotated while revolving along the outer circumference of the spin driven gear 280.

In the spin mechanism 250, the spin driving gear 270 is not directly engaged with the spin driven gear 280, and the spin driving gear 270 and the spin driven gear 280 may be connected via the spin intermediate gear 290 (see FIG. 7).

The spin intermediate gear 290 may be rotatably connected to the spin cover 220. The spin cover 200 may be provided with an intermediate gear support shaft for rotatably supporting the spin intermediate gear 290. The intermediate gear support shaft may protrude downward from the bottom surface of the spin cover 220. The spin intermediate gear 290 may be accommodated in the space S2 of the spin body 200 like the spin driving gear 290.

The spin intermediate gear 290 may transmit power between the spin driving gear 270 and the spin driven gear 280. The spin intermediate gear 290 may revolve along the outer circumference of the spin driven gear 280.

Hereinafter, the outer body 300 will be described.

The outer body 300 may be formed to be larger than the spin housing 210. The bottom surface of the outer body 300 may be opened. An upper space S3 may be formed inside the outer body 300. The upper space S3 may be a space in which the tilting base 320 is accommodated.

The outer body 300 may include a combination of a plurality of members, and may include a plurality of bodies that are disposed in a longitudinal or vertical direction and coupled to each other.

The outer body 300 may include a first body 311 and a second body 312 coupled to the first body 311.

The second body 312 may for a space S3 together with the first body 311, and the space S3 may be formed between the first body 311 and the second body 312.

When the first body 311 is a front outer body, the second body 312 may be a rear outer body coupled to the rear end of the first body 311. When the first body 311 is a left outer body, the second body 312 may be a right outer body coupled to the right end of the first body 311.

The interface module 400 may be mounted on the outer body 300, and the outer body 300 may be fastened to the tilting body 320.

The interface module 400 may be mounted on the outer body 300, and the tilting base 320 may be fastened to the lower portion of the outer body 300.

The outer body 300 may be provided with a module accommodation portion 313 (see FIG. 8) on which the interface module 400 is mounted. The interface module 400 may be inserted into the module accommodation portion 313 and disposed in the module accommodation portion 313.

In the outer body 300, the interface module 400 may be disposed in the first body 311, and the module accommodation portion 313 may be formed in the first body 311.

The module accommodation portion 313 of the outer body 300 may be formed in the first body 311. In this case, the first body 311 may be a front housing facing the human so as to communicate with the human.

The robot may further include a tilting base 320 that is fastened to the outer body 300 and tilts the outer body 300.

Hereinafter, the tilting base 320 and the tilting mechanism 350 will be described.

The tilting base 320 may be protected by the outer body 300 in a state of being accommodated in the upper space S3 of the outer body 300. The tilting base 320 may be connected to the tilting shaft OT and rotated together with the tilting shaft OT. A tilting shaft connection portion 321 (see FIG. 7), to which the tilting shaft OT is connected, may be formed in the tilting base 320. The tilting shaft connection portion 321 may elongate in the horizontal direction at the lower portion of the tilting base 320.

The tilting shaft OT may be elongated in the tilting base 320 in the horizontal direction.

The tilting shaft OT may be connected to the tilting base 320, and the tilting base 320 may be coupled to the outer body 300. During the rotation of the tilting shaft OT, the tilting base 320 and the outer body 300 may tilt while rotating together about the tilting shaft OT. The tilting base 320 and the outer body 300 may constitute a tilting body that can tilt the interface module 400.

A tilting base connection portion 314 (see FIG. 8), to which the tilting base 320 is coupled, may be formed on the inner surface of the outer body 300. The connection portion 324 (see FIG. 8), into which the tilting base connection portion 314 is inserted and fitted, may be formed in the tilting base 320.

The tilting base connection portion 314 may include a pair of ribs spaced apart from each other by an interval corresponding to the thickness of the connection portion 324 such that the connection portion 324 is inserted and fitted thereinto.

The connection portion 324 may be formed at part of the outer circumference of the tilting base 320 and may be inserted between one pair of ribs.

The outer body 300 may be provided with a tilting base 320 and a tilting base mounter 315 (see FIG. 8) fastened by a fastening member such as a screw. The tilting base 320 may be provided with a fastening portion 325 (see FIG. 8) fastened to the tilting base mounter 315 by a fastening member such as a screw.

The tilting base mounter 315 may protrude from the outer body 300 toward the upper space S3.

The fastening portion 325 may include a fastening boss to which the fastening member such as the screw is fastened.

The fastening portion 325 may be formed on an opposite side of the tilting base 320 to the connection portion 324.

The tilting base 320 may be disposed across the upper space S3 formed inside the outer body 300.

The tilting base connection portion 314 and the tilting base mounter 315 may be formed on the inner lower portion of the outer body 300. In this case, the tilting base 320 may be disposed across the inner lower portion of the outer body 300, and the lower strength of the outer body 300 may be reinforced.

In the robot, the battery 34 may be mounted on at least one of the base 100, the spin body 200, the outer body 300, or the interface module 400.

The battery 34 is preferably mounted in a configuration that is relatively low in height among the configurations of the robot and can be disposed on the rotational shaft OS. To this end, the battery 34 may be disposed on the tilting base 320. The tilting base 320 may be provided with a pocket into which the battery 34 is inserted and accommodated. The battery cover 35 (see FIG. 8) may be coupled to the tilting base 320 so as to prevent the battery 34 accommodated in the pocket from being removed.

A connecting PCB 36 may be disposed in the tilting base 320. The connecting PCB 36 may be connected to at least one of the PCB 230 or the base PCB 103 mounted on the spin cover 230 by wires, and may be connected to at least one of the PCB 340 mounted on the outer body 300 and the interface PCB 406 of the interface module 400 by wires.

The tilting mechanism 350 may be connected to the tilting body 300 or the outer body 300 so as to tilt the outer body 300 and the tilting base 320 about the tilting shaft OT.

The tilting mechanism 350 may include a tilting motor 360, a tilting driving gear 370 connected to the tilting motor 360, and a tilting driven gear 380 connected to the tilting shaft OT or the tilting base 320 and engaged with the tilting driving gear 370.

The tilting motor 360 may be disposed below the spin cover 220 and accommodated in the space S2.

The tilting driving gear 370 may elongate in a direction intersecting with the tilting shaft OT.

The tilting driven gear 380 may be disposed above the spin cover 220, and the tilting motor 360 and the tilting driven gear 380 may be connected through the tilting driving gear 370, with the spin cover 220 disposed therebetween.

A through-hole through which at least one of the driving shaft of the tilting motor 360 or the tilting driving gear 370 passes may be formed in the spin cover 220 in the vertical direction. At least one of the driving shaft of the tilting motor 360 or the rotational shaft of the tilting driving gear 370 may be disposed in the through-hole of the spin cover 220.

The spin cover 220 may be provided with a tilting motor fastening portion to which the tilting motor 360 is fastened. The tilting motor 360 may be fastened to the tilting motor fastening portion disposed below the spin cover 220. The tilting motor 360 may be fastened to the spin cover by a fastening member such as a screw. The tilting motor fastening portion may be a fastening boss or a fastening hole formed in the spin cover 220.

The driving shaft of the tilting motor 360 may be disposed in a direction intersecting with the tilting shaft OT. The tilting shaft OT may extend in the horizontal direction, and the tilting motor 360 may be mounted on the spin cover 220 with the driving shaft extending in the vertical direction.

The tilting driving gear 370 may be rotated by the tilting motor 360. The tilting driving gear 370 may be a worm gear disposed vertically. The worm gear that is the tilting driving gear 370 may be vertically disposed on the tilting cover 210 in a state of being connected to the tilting motor 360.

The tilting driven gear 380 may be a spur gear that rotates about the tilting shaft OT. The tilting driven gear 380 may be connected to at least one of the tilting shaft OT or the tilting base 320 so as to tilt the tilting body 320.

The tilting driven gear 380 may be connected to the tilting body 320 so as to rotate the tilting base 320 about the tilting shaft OT.

The tilting driven gear 380 may include a tilting base fastening portion that can be fastened to the tilting base 320 by a fastening member such as a screw.

The robot may further include a gear supporter 390 mounted on the spin cover 220 and supporting the tilting driving gear 360.

The spin cover 220 may be provided with a gear supporter fastening portion to which the gear supporter 390 is fastened. The gear supporter 390 may be fastened to the spin cover 220 by a fastening member such as a screw, and the gear supporter fastening portion may be a fastening boss or a fastening hole formed in the spin cover 220.

Meanwhile, the display 42, the camera 54, and the microphone 56 may be mounted on the outer body 300 or the interface module 400 and rotated together with the outer body 300 during the rotation of the spin body 200, and may be tilted together with the outer body 300 during the tilting of the tilting body 300.

The interface module 400 may include interfaces other than the interfaces accommodated in the space S2, and may include the display 42, the camera 54, the microphone 56, and the like.

Referring to FIG. 8, the interface module 400 may include an interface case 403 mounted on the outer body 300 and having an opening 401 and a camera accommodation portion 402 formed therein, a front cover 404 disposed on the front surface of the interface case 403 and covering the opening 401 and the camera accommodation portion 402, and a back cover 405 coupled to the interface case 403.

The back surface of the interface case 403 may be opened, and the opening 401 and the camera accommodation portion 402 may be formed on the front surface of the interface case 403.

The front cover 404 may cover the front surface of the interface case 404.

The back cover 405 may be disposed inside the interface case 403 and may be fastened to the interface case 403 by a fastening member such as a screw. The back cover 405 may be disposed to cover the back surface of the interface PCB 406, particularly the main PCB 407 (see FIG. 10) to be described below.

The interface module 400 may further include an interface PCB 406 disposed in the back cover 405.

The display 42 constituting the interface of the present disclosure may be disposed between the interface PCB 406 and the front cover 404 to constitute the interface module 400. All or part of the display 42 may be accommodated in the opening 401 and may output an image through the front cover 404.

Meanwhile, the camera 54 constituting the interface of the present disclosure may be disposed between the back cover 405 and the front cover 404. All or part of the camera 54 may be accommodated in the camera accommodation opening 402 and may capture an image through the front cover 404.

Meanwhile, the robot may further include an inner frame 330 supporting the outer body 300. The inner frame 330 reinforces the strength of the outer body 300. The strength of the outer body 300 may be reinforced by connecting weak portions of the outer body 300 to each other.

The strength of the outer body 300 around the module accommodation portion 313 may be relatively weak and inner frame 330 may connect the periphery of the module accommodation portion 313.

When the module accommodation portion 313 is formed in the first body 311, the inner frame 330 preferably connects the upper periphery of the module accommodation portion 313 and the lower periphery of the opening 311 in the first body 311. In addition, the inner frame 330 is preferably connected to the upper portion of the second body 312.

The inner frame 330 may have a polygonal shape, and may be disposed in the upper space S3 of the outer body 300 to function as a frame for supporting the outer body 300.

The inner frame 330 may be disposed on the tilting base 320. In this case, the tilting base 320 may be a lower reinforcing member for reinforcing the lower strength of the outer body 300, and the inner frame 330 may be an upper reinforcing member for reinforcing the upper strength of the outer body 300.

FIG. 9 is a perspective view illustrating a state in which the outer body according to the embodiment is disassembled, FIG. 10 is an enlarged exploded perspective view of a hook unit, a supporting rib, and a hanger unit according to an embodiment, and FIG. 11 is a view illustrating the inner surface of the outer body when the first body and the second body according to the embodiment are fastened.

The outer body 300 may include a combination of the first body 311 and the second body 312. The first body 311 and the second body 312 preferably maintain the coupled state with high reliability without being distorted or disassembled during external impact or drop.

The outer body 300 may include a hook unit 301 for coupling the first body 311 and the second body 312, and a supporting rib 304 for mutually supporting the first body 311 and the second body 312.

The hook unit 301 and the supporting rib 304 may be formed to be positioned inside the outer body 300 when the first body 311 and the second body 312 are coupled to each other, and may be hidden by the first body 311 and the second body 312 so as to be invisible from the outside.

The hook unit 301 and the supporting rib 304 may be formed at different heights.

The hook unit 301 may elastically attach or detach one of the first body 311 and the second body 312 to or from the other.

The hook unit 301 may include a hook 302 and a hook fastening body 303.

The hook 302 may be formed on the inner surface of one of the first body 311 and the second body 312, and may protrude toward the inner surface of the other of the first body 311 and the second body 312.

The hook 302 is elastically attached or detached to or from the hook fastening body 303. When the hook 302 is inserted into and hooked to the hook fastening body 303, the hook fastening body 303 may restrict any detachment of the hook 302, and the hook 302 may be coupled to the hook fastening body 303 and maintain the coupled state.

The hook fastening body 303 may be formed to protrude toward the inner surface of one of the first body 311 and the second body 312 on the inner surface of the other of the first body 311 and the second body 312.

When the hook 302 is formed in the first body 311, the hook fastening body 303 may be formed in the second body 312.

On the contrary, when the hook 302 is formed in the second body 312, the hook fastening body 303 may be formed in the first body 311.

The hook 302 may include a protrusion 302A, an extension 302B, and a gradient 302C.

The protrusion 302A may protrude from the inner surface of one of the first body 311 and the second body 312.

The extension 302B may extend toward the inside of the other of the first body 311 and the second body 312 at the protrusion 302A, and may be formed spaced apart from the inner surface of one of the first body 311 and the second body 312.

The extension 302B may be spaced apart from the body from which the protrusion 302A protrudes among the first body 311 and the second body 312. While the hook 302 is moved to be fitted to the hook fastening body 303, part of the extension 302B may be bent in a direction close to the body from which the protrusion 302A protrudes among the first body 311 and the second body 312. The gradient 302C may help move along hook fastening body 303.

The gradient 302C may be formed on the side of extension 302B. The gradient 302C may have an inclined surface, and the gradient 302C may be guided along the hook fastening body 303 with part of the extension 302B. The gradient 302C may be caught in the hook hole 303A formed in the hook fastening body 303.

The hook fastening body 303 may have a hook hole 303A into which the gradient 302C is inserted and caught.

The hook fastening body 303 may be formed to be larger than the hook 302. The hook fastening body 303 may have a pocket shape surrounding the side, top, and bottom surfaces of the hook 302.

The hook fastening body 303 may have a hook accommodation space in which part of the hook 302, for example, the extension 302B, is inserted.

When the hook 302 is inserted into the space in which the hook fastening body 303 is formed, the hook fastening body 303 may be disposed between the body in which the hook fastening body 303 is formed in the horizontal direction and the hook fastening body 303.

In the hook 302, the extension 302B and the gradient 302C may be interpolated into the hook fastening body 30. When the gradient 302C is disposed next to the hook hole 303A, the extension 303B may be elastically restored and the gradient 302C may be inserted into the hook hole 303A to be caught in the periphery 303B of the hook hole 303A.

The supporting rib 304 may protrude to the other of the first body 311 and the second body 312, and may contact the inner surface of one of the first body 311 and the second body 312.

The hook unit 301 may be formed on the outer body 300. The hook unit 301 may be disposed closer to the upper end of the outer unit 300 rather than the lower end thereof.

The outer body 300 may further include a plurality of hanger units 307 that hang one of the first body 311 and the second body 312 to the other.

Each of the plurality of hanger units 307 may be spaced apart from each of the hook unit 301 and the supporting rib 304.

Each of the plurality of hanger units 307 may include a contact body 308 in which a hanger hole 308A is formed.

The contact body 308 may protrude from the inner surface of one of the first body 311 and the second body 312, and may be formed to contact the inner surface of the other of the first body 311 and the second body 312.

In this case, an accommodation groove 309 into which the contact body 308 is inserted and accommodated may be formed in the inner surface of the other of the first body 311 and the second body 312. The accommodation groove 309 may be provided with a protrusion 309A inserted into the hanger hole 308A.

When the contact body 308 is formed to protrude toward the inner surface of the second body 312 on the inner surface of the first body 311, the accommodation groove 309 in which the protrusion 309A is formed may be formed to be recessed on the inner surface of the second body 312.

On the contrary, when the contact body 308 is formed to protrude toward the inner surface of the first body 311 on the inner surface of the second body 312, the accommodation groove 309 in which the protrusion 309A is formed may be formed to be recessed on the inner surface of the first body 311.

The plurality of hanger units 307 may be formed spaced apart from each other along the boundary between the first body 311 and the second body 312.

When the outer body 300 further includes the plurality of hanger units 307, the hook unit 301 may be formed to be positioned between the uppermost hanger unit among the plurality of hanger units 307 and the other hanger unit closest to the uppermost hanger unit.

The supporting rib 304 may include a protrusion 305 and a contact 306 extending from the protrusion 305.

The protrusion 305 may protrude from the other of the first body 311 and the second body 312.

The contact 306 may be disposed inside one of the first body and the second body and may contact the inner surface of one of the first body and the second body.

The length of the protrusion 305 may be longer than the length of the contact 306.

The length of the contact 306 may be 3 mm to 10 mm in the horizontal direction.

The supporting rib 304 may be closer to the lower end of the outer body than the upper end of the outer body 300.

The outer body 300 may further include a supporting body 310 spaced apart from the supporting rib 304. The supporting body 310 may be formed to contact the inner surface of one of the first body and the second body on the other of the first body and the second body. The supporting body 310 may be disposed higher than the supporting rib 304. The supporting body 310 may have a polygonal shape.

Meanwhile, in the outer body 300, a portion disposed around the boundary between the first body 311 and the second body 312 is screwed with the tilting base 320.

A first fastening boss 317 may be formed in the first body 311 or the second body 312. The tilting base 320 may be formed with a second fastening boss 327 that coincides with the first fastening boss 317 and fastened with the first fastening boss 317 by a fastening member.

The first fastening boss 317 may protrude toward the other one of the first body 311 and the second body 312. The second fastening boss 317 may be formed in the contact body 308 of one of the plurality of hanger units 308.

The second fastening boss 327 may protrude upward from the tilting base 320.

The first fastening boss 317 and the second fastening boss 327 may coincide with each other in the horizontal direction.

The above description is merely illustrative of the technical idea of the present disclosure, and various modifications and changes may be made thereto by those skilled in the art without departing from the essential characteristics of the present disclosure.

Therefore, the embodiments of the present disclosure are not intended to limit the technical spirit of the present disclosure but to describe the technical idea of the present disclosure, and the technical spirit of the present disclosure is not limited by these embodiments.

The scope of protection of the present disclosure should be interpreted by the appending claims, and all technical ideas within the scope of equivalents should be construed as falling within the scope of the present disclosure.

The invention claimed is:

1. A robot comprising:
an outer body having a space formed therein;
an interface module mounted on the outer body;
a tilting base fastened to the outer body; and
a tilting mechanism connected to the tilting base to tilt the outer body,
wherein the outer body comprises:
a first body in which a module accommodation portion accommodating the interface module is formed;
a second body forming the space with the first body;
a hook unit elastically attaching or detaching one of the first body or the second body to or from another of the first body or the second body; and
a supporting rib protruding from the other of the first body or the second body and contacting an inner surface of one of the first body or the second body,
wherein the hook unit includes:
a hook protruding toward the inner surface of the other of the first body and the second body formed on the inner surface of one of the first body or the second body; and
a hook fastening body protruding toward the inner surface of one of the first body or the second body on the inner surface of another of the first body or the second body, the hook being elastically attached to or detached from the hook fastening body,
wherein the hook includes:
a protrusion protruding from the inner surface of one of the first body or the second body;
an extension extending from the protrusion toward the inside of the other of the first body and the second body and spaced apart from the inner surface of one of the first body or the second body; and
a gradient formed on a side of the extension and having an inclined surface, and
wherein a hook hole into which the gradient is inserted and caught is formed in the hook fastening body.

2. The robot according to claim 1, wherein the hook unit is formed on an upper portion of the outer body.

3. The robot according to claim 1, wherein the outer body further comprises a plurality of hanger units spaced apart from the hook unit and the supporting rib and hanging one of the first body or the second body to another one of the first body or the second body.

4. The robot according to claim 3, wherein each of the plurality of hanger units comprises:
a contact body protruding from the inner surface of one of the first body or the second body to contact the inner surface of another one of the first body or the second body;
an accommodation groove into which the contact body is inserted and accommodated is formed on the inner surface of the other of the first body and the second body;
a protrusion protrudes from the accommodation groove; and
a hanger hole into which the protrusion is inserted and caught is formed in the contact body.

5. The robot according to claim 3, wherein the hook unit is formed between an uppermost hanger unit among the plurality of hanger units and another hanger unit closest to the uppermost hanger unit.

6. The robot according to claim 1, wherein the hook fastening body surrounds side, top, and bottom surfaces of the hook.

7. The robot according to claim 1, wherein the supporting rib comprises:
a protrusion protruding from the other of the first body and the second body; and
a contact extending from the protrusion, disposed in one of the first body or the second body, and contacting the inner surface of one of the first body or the second body.

8. The robot according to claim 7, wherein a length of the protrusion is longer than a length of the contact.

9. The robot according to claim 7, wherein a length of the contact is 3 mm to 10 mm in a horizontal direction.

10. The robot according to claim 1, wherein the supporting rib is closer to a lower end of the outer body than an upper end of the outer body.

11. A robot comprising:
an outer body having a space formed therein;
an interface module mounted on the outer body;
a tilting base fastened to the outer body; and
a tilting mechanism connected to the tilting base to tilt the outer body,
wherein the outer body includes:
a first body in which a module accommodation portion accommodating the interface module is formed;
a second body forming the space with the first body;
a hook unit elastically attaching or detaching one of the first body or the second body to or from another of the first body or the second body; and
a supporting rib protruding from the other of the first body or the second body and contacting an inner surface of one of the first body or the second body, and
wherein a support body of a polygonal shape contacting the inner surface of one of the first body and the second body and disposed higher than the supporting rib protrudes from the other of the first body and the second body.

12. A robot comprising:
an outer body having a space formed therein;
an interface module mounted on the outer body;
a tilting base fastened to the outer body; and
a tilting mechanism connected to the tilting base to tilt the outer body,
wherein the outer body includes:
a first body in which a module accommodation portion accommodating the interface module is formed;
a second body forming the space with the first body;
a hook unit elastically attaching or detaching one of the first body or the second body to or from another of the first body or the second body; and
a supporting rib protruding from the other of the first body or the second body and contacting an inner surface of one of the first body or the second body, and
wherein a first fastening boss is formed in the first body or the second body, and a second fastening boss coinciding with the first fastening boss and fastened to the first fastening boss by a fastening member is formed in the tilting base.

13. The robot according to claim 12, wherein the first fastening boss protrudes toward the other of the first body and the second body,
the second fastening boss protrudes upward from the tilting base, and
the first fastening boss and the second fastening boss coincide with each other in a horizontal direction.

14. A robot comprising:
an outer body having a space formed therein;
an interface module mounted on the outer body;
a tilting base fastened to the outer body; and
a tilting mechanism connected to the tilting base to tilt the outer body,
wherein the outer body comprises:
a first body in which a module accommodation portion accommodating the interface module is formed;
a second body forming the space with the first body;
a hook unit elastically attaching or detaching one of the first body or the second body to or from another one of the first body or the second body; and
a supporting rib protruding from the other of the first body or the second body and contacting an inner surface of one of the first body or the second body,
wherein the first body is disposed in front of the second body,
wherein the tilting base is disposed between an inner surface of the first body and an inner surface of the second body,
wherein the first body comprises a first fastening boss protrudes toward the second body, and
wherein a second fastening boss protrudes from the tilting base and fastened with the first fastening boss, and the first fastening boss and the second fastening boss coincide with each other in a horizontal direction.

15. The robot according to claim 14, further comprising an inner frame connecting the first body and the second body,
wherein the inner frame is space apart from the tilting base in up and down direction.

16. The robot according to claim 14, wherein the second body is provided with a tilting base mounter, and
wherein the tilting base is provided with a fastening portion fastened to the tilting base mounter by a fastening member.

17. The robot according to claim 14, wherein the first fastening boss is respectively formed at a left rear side of the first body and a right rear side of the first body.

18. A robot comprising:
an outer body having a space formed therein;
an interface module mounted on the outer body;
a tilting base fastened to the outer body; and
a tilting mechanism connected to the tilting base to tilt the outer body,
wherein the outer body comprises:
a first body in which a module accommodation portion accommodating the interface module is formed;
a second body forming the space with the first body;
a hook unit elastically attaching or detaching one of the first body or the second body to or from another of the first body or the second body;
a supporting rib protruding from the other of the first body or the second body and contacting an inner surface of one of the first body or the second body; and
at least one hanger unit hanging one of the first body or the second body to the other,
wherein the first body comprises a first fastening boss protrudes toward the second body,
wherein the first fastening boss is respectively formed at a left rear side of the first body and a right rear side of the first body,
wherein a second fastening boss protrudes from the tilting base and fastened with the first fastening boss, and
wherein a height of the at least one hanger unit is lower than a height of the first fastening boss.

* * * * *